(12) United States Patent
Uchihashi et al.

(10) Patent No.: US 10,049,701 B2
(45) Date of Patent: *Aug. 14, 2018

(54) VIDEO EDITING APPARATUS, VIDEO EDITING METHOD, AND NON-TRANSITORY COMPUTER READABLE MEDIUM

(71) Applicant: FUJI XEROX CO., LTD., Tokyo (JP)

(72) Inventors: Shingo Uchihashi, Kanagawa (JP); Motofumi Fukui, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/233,516

(22) Filed: Aug. 10, 2016

(65) Prior Publication Data
US 2017/0256284 A1 Sep. 7, 2017

(30) Foreign Application Priority Data
Mar. 7, 2016 (JP) .................................. 2016-043051

(51) Int. Cl.
*G11B 27/031* (2006.01)
*G11B 27/34* (2006.01)

(52) U.S. Cl.
CPC ............ *G11B 27/031* (2013.01); *G11B 27/34* (2013.01)

(58) Field of Classification Search
CPC .............................. G11B 27/34; G11B 27/031
USPC .................................. 386/290, 278, 281, 282
See application file for complete search history.

(56) References Cited

U.S. PATENT DOCUMENTS

| | | | |
|---|---|---|---|
| 2001/0056427 A1* | 12/2001 | Yoon | G06F 17/30817 |
| 2002/0157095 A1 | 10/2002 | Masumitsu et al. | |
| 2011/0243529 A1 | 10/2011 | Oryoji et al. | |
| 2017/0255699 A1* | 9/2017 | Uchihashi | G06F 17/30828 |

FOREIGN PATENT DOCUMENTS

| | | |
|---|---|---|
| JP | 2002-259720 A | 9/2002 |
| JP | 2004-126811 A | 4/2004 |
| JP | 2011-217209 A | 10/2011 |

OTHER PUBLICATIONS

Boreczky et al., "Comparison of video shot boundary detection techniques," Journal of Electronic Imaging, Apr. 1996, vol. 5, No. 2, pp. 122-128.

* cited by examiner

*Primary Examiner* — Robert Chevalier
(74) *Attorney, Agent, or Firm* — Oliff PLC

(57) ABSTRACT

A video editing apparatus includes a storing unit, an input unit, a segment selection unit, and a generation unit. The storing unit stores video data along with video attribute information indicating, for each concept, a confidence score that the concept is included in each of segments into which the video data has been divided. The input unit inputs, as preference information, a coefficient of each concept desired to be included in summary information and a coefficient of a superordinate concept of the concept desired to be included in the summary information. The segment selection unit selects, based on the input preference information, at least one segment that matches the preference information, from among plural segments of the stored video data. The generation unit generates, based on video of the at least one selected segment, summary information representing contents of the video.

9 Claims, 20 Drawing Sheets

FIG. 5

| SEGMENT NUMBER | START TIME | END TIME | CONCEPT 1 (SUSHI) | CONCEPT 2 (SOBA) | CONCEPT 3 (SCUBA DIVING) | CONCEPT 4 (GOLF) | CONCEPT 5 (HORSE RIDING) | ... | CONCEPT N (CASTLES) |
|---|---|---|---|---|---|---|---|---|---|
| 1 | 0 | 3436 | 0.196 | 0.179 | 0.195 | 0.412 | 0.134 | ... | 0.312 |
| 2 | 3436 | 4854 | 0.161 | 0.171 | 0.114 | 0.171 | 0.139 | ... | 0.395 |
| 3 | 4854 | 9409 | 0.144 | 0.159 | 0.089 | 0.159 | 0.180 | ... | 0.333 |
| 4 | 9409 | 10994 | 0.167 | 0.195 | 0.167 | 0.195 | 0.249 | ... | 0.105 |
| 5 | 10994 | 12495 | 0.169 | 0.148 | 0.169 | 0.148 | 0.123 | ... | 0.098 |
| 6 | 12495 | 15765 | 0.723 | 0.145 | 0.111 | 0.145 | 0.166 | ... | 0.045 |
| 7 | 15765 | 19234 | 0.512 | 0.195 | 0.112 | 0.179 | 0.166 | ... | 0.095 |
| 8 | 19234 | 25066 | 0.098 | 0.180 | 0.096 | 0.110 | 0.110 | ... | 0.110 |

| SUPERORDINATE CONCEPT 1 (DINING) | SUPERORDINATE CONCEPT 2 (ACTIVITIES) | SUPERORDINATE CONCEPT 3 (SHOPPING) | ... | SUPERORDINATE CONCEPT M (SIGHTSEEING SPOTS) |
|---|---|---|---|---|
| $W_1$ | $W_2$ | $W_3$ | ... | $W_M$ |
| 0.3 | 0.9 | 0.1 | ... | 0.2 |

FIG. 10B

| CONCEPT 1 (SUSHI) | CONCEPT 2 (SOBA) | CONCEPT 3 (SCUBA DIVING) | CONCEPT 4 (GOLF) | CONCEPT 5 (HORSE RIDING) | CONCEPT 6 (SHOPPING) | ... | CONCEPT N (CASTLES) |
|---|---|---|---|---|---|---|---|
| $w_{11}$ | $w_{12}$ | $w_{23}$ | $w_{24}$ | $w_{25}$ | $w_{36}$ | ... | $w_{MN}$ |
| 0.5 | 0.6 | 0.0 | 0.8 | 0.1 | 0.1 | ... | 0.2 |

FIG. 12

SCORE FOR SUBORDINATE CONCEPT = $S_1 \cdot w_{11} + S_2 \cdot w_{12} + S_3 \cdot w_{23} + S_4 \cdot w_{24} + S_5 \cdot w_{25}$
$+ S_6 \cdot w_{36} + \cdots\cdots + S_N \cdot w_{MN}$ ......(1)

SCORE FOR SUPERORDINATE CONCEPT = $W_1 \cdot \max(S_1 \cdot w_{11}, S_2 \cdot w_{12}) + W_2 \cdot \max(S_3 \cdot w_{23}, S_4 \cdot w_{24}, S_5 \cdot w_{25})$
$+ w_3 \cdot S_6 \cdot w_{36} + \cdots\cdots + W_M \cdot \max(S_{(N-1)} \cdot w_{M(N-1)}, S_N \cdot w_{MN})$ ......(2)

HERE, $\max(A, B, C)$ IS MAXIMUM VALUE AMONG A, B, AND C.

VIDEO SCORE = $p \times$ SCORE FOR SUBORDINATE CONCEPT
$+ (1 - p) \times$ SCORE FOR SUPERORDINATE CONCEPT ......(3)

HERE, $0 \leq p \leq 1$.

FIG. 13

SCORE FOR SUBORDINATE CONCEPT = $0.196 \times 0.5 + 0.179 \times 0.6 + 0.195 \times 0.0 + 0.412 \times 0.8$
$+ 0.134 \times 0.1 + 0.264 \times 0.1 + \cdots + 0.312 \times 0.2$
$= 20.124 \quad \cdots\cdots (1)$ SCORE FOR SUPERORDINATE CONCEPT = $0.3 \times 0.179 \times 0.6 + 0.9 \times 0.412 \times 0.8 + 0.1 \times 0.264 \times 0.1 +$
$\cdots + 0.2 \times 0.312 \times 0.2$
$= 30.806 \quad \cdots\cdots (2)$ VIDEO SCORE = $p \times$ SCORE FOR SUBORDINATE CONCEPT $+ (1 - p)$
$\times$ SCORE FOR SUPERORDINATE CONCEPT
$= 0.4 \times 20.124 + 0.6 \times 30.806$
$\approx \mathbf{26.533} \quad \cdots\cdots (3)$ HERE, $p = 0.4$.

| SUPERORDINATE CONCEPT 1 (DINING) | SUPERORDINATE CONCEPT 2 (ACTIVITIES) | SUPERORDINATE CONCEPT 3 (SHOPPING) | ... | SUPERORDINATE CONCEPT M (SIGHTSEEING SPOTS) |
|---|---|---|---|---|
| W1 | W2 | W3 | ... | $W_M$ |
| 0.3 | 0.9 → 0.45 | 0.1 | ... | 0.2 |

CHANGE

| CONCEPT 1 (SUSHI) | CONCEPT 2 (SOBA) | CONCEPT 3 (SCUBA DIVING) | CONCEPT 4 (GOLF) | CONCEPT 5 (HORSE RIDING) | CONCEPT 6 (SHOPPING) | ... | CONCEPT N (CASTLES) |
|---|---|---|---|---|---|---|---|
| w11 | w12 | w23 | w24 | w25 | w36 | ... | $w_{MN}$ |
| 0.5 | 0.6 | 0.0 | 0.8 → 0.4 | 0.1 | 0.1 | ... | 0.2 |

CHANGE

FIG. 16

| SEGMENT NUMBER | CONCEPT 1 (SUSHI) | CONCEPT 2 (SOBA) | CONCEPT 3 (SCUBA DIVING) | CONCEPT 4 (GOLF) | CONCEPT 5 (HORSE RIDING) | ... | CONCEPT N (CASTLES) |
|---|---|---|---|---|---|---|---|
| 1 | 0.196 | 0.179 | 0.195 | 0.412 | 0.134 | ... | 0.312 |
| 6 | 0.723 | 0.145 | 0.111 | 0.145 | 0.166 | ... | 0.045 |
| 7 | 0.512 | 0.195 | 0.112 | 0.179 | 0.166 | ... | 0.095 |
| 4 | 0.167 | 0.195 | 0.167 | 0.195 | 0.249 | ... | 0.105 |
| 5 | 0.169 | 0.148 | 0.169 | 0.148 | 0.123 | ... | 0.098 |
| 2 | 0.161 | 0.171 | 0.114 | 0.171 | 0.139 | ... | 0.395 |
| 8 | 0.098 | 0.180 | 0.096 | 0.110 | 0.110 | ... | 0.110 |
| 3 | 0.144 | 0.159 | 0.089 | 0.159 | 0.180 | ... | 0.333 |

FIG. 20

| SEGMENT NUMBER | CONCEPT 1 (SUSHI) | CONCEPT 2 (SOBA) | CONCEPT 3 (SCUBA DIVING) | CONCEPT 4 (GOLF) | CONCEPT 5 (HORSE RIDING) | ... | CONCEPT N (CASTLES) |
|---|---|---|---|---|---|---|---|
| 1 | 0.196 | 0.179 | 0.195 | 0.412 | 0.134 | ... | 0.312 |
| 6 | 0.723 | 0.145 | 0.111 | 0.145 | 0.166 | ... | 0.045 |
| 7 | 0.512 | 0.195 | 0.112 | 0.179 | 0.166 | ... | 0.095 |
| INTEGRATED VIDEO VECTOR INFORMATION | 0.723 | 0.195 | 0.195 | 0.412 | 0.166 | ... | 0.312 |

VIDEO EDITING APPARATUS, VIDEO EDITING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-043051 filed Mar. 7, 2016.

BACKGROUND

The present invention relates to a video editing apparatus, a video editing method, and a non-transitory computer readable medium.

SUMMARY

According to an aspect of the invention, there is provided a video editing apparatus including a storing unit, an input unit, a segment selection unit, and a generation unit. The storing unit stores video data along with video attribute information indicating, for each concept, a confidence score that the concept is included in each of segments into which the video data has been divided. The input unit inputs, as preference information, a coefficient of each concept which is desired to be included in summary information and a coefficient of a superordinate concept of the concept which is desired to be included in the summary information. The segment selection unit selects, based on the preference information input by the input unit, at least one segment that matches the preference information, from among plural segments of the video data stored in the storing unit. The generation unit generates, based on video of the at least one segment selected by the segment selection unit, summary information representing contents of the video.

BRIEF DESCRIPTION OF THE DRAWINGS

Exemplary embodiments of the present invention will be described in detail based on the following figures, wherein:

FIG. 5 is a diagram illustrating a specific example of N-dimensional video vector information calculated by the video vector information calculation unit;

FIG. 7 is a diagram illustrating an example of an input screen displayed when preference information of a user is input;

FIGS. 10A and 10B are diagrams illustrating an example of preference information obtained through the screen examples illustrated in FIGS. 7 to 9;

FIG. 12 is a diagram illustrating specific calculation expressions for calculating a score for a subordinate concept, a score for a superordinate concept, and a video score;

FIG. 13 is a diagram illustrating a calculation example in which a score for a subordinate score, a score for a superordinate concept, and a video score are specifically calculated using specific values;

FIG. 16 is a diagram illustrating a specific example of segments rearranged in a selection order by the segment selection unit;

FIG. 20 is a diagram for explaining a case where segments 1, 6, and 7 are selected.

DETAILED DESCRIPTION

Exemplary embodiments of the present invention will be described in detail with reference to drawings.

Figure 1:
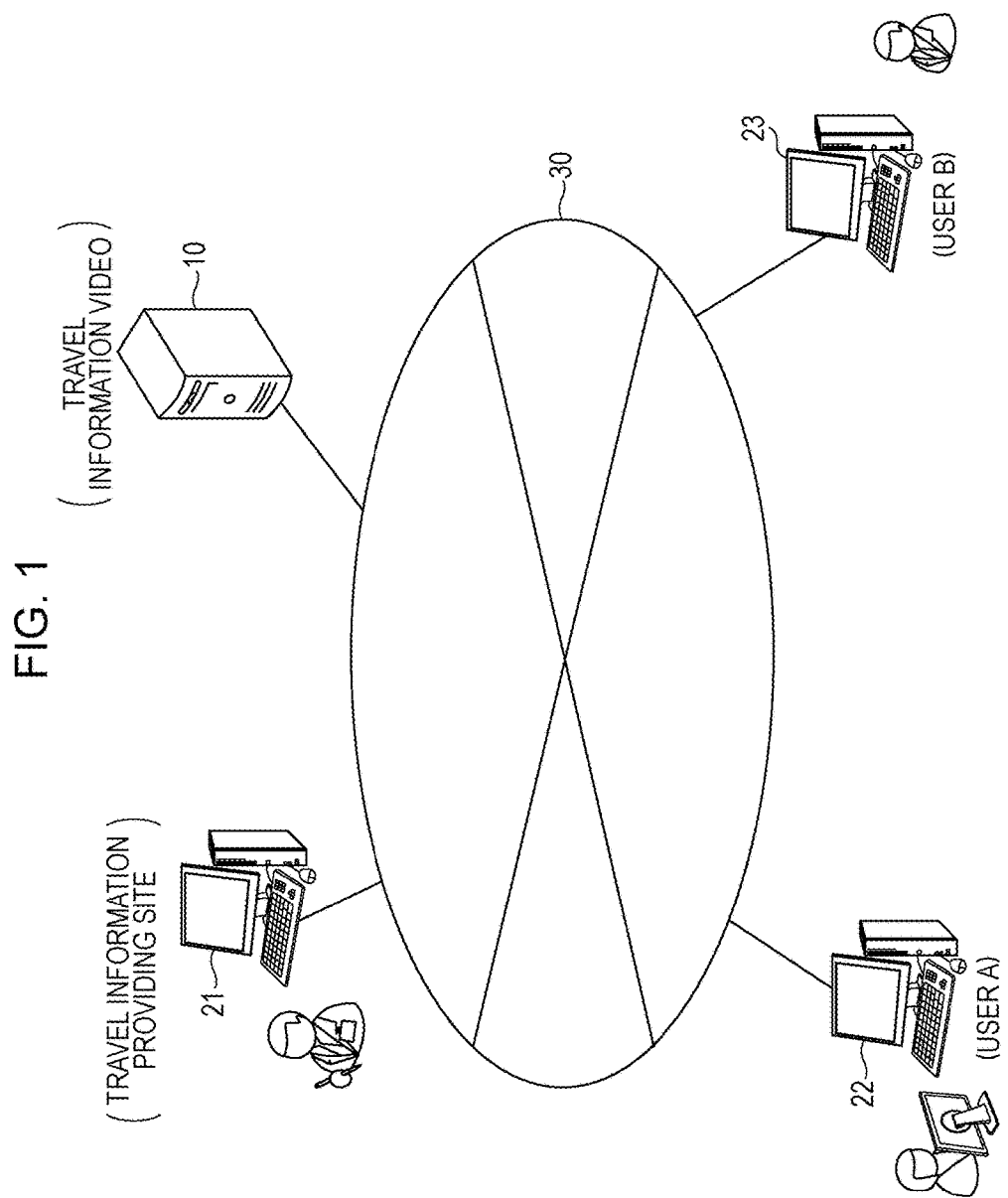
FIG. 1 is a diagram illustrating a system configuration of a travel information providing system according to an exemplary embodiment of the present invention.

FIG. 1 is a system diagram illustrating a configuration of a travel information providing system according to an exemplary embodiment of the present invention.

A travel information providing system according to an exemplary embodiment of the present invention includes, as illustrated in FIG. 1, a server apparatus 10 and terminal apparatuses 21 to 23 which are connected by a network 30 such as the Internet. The server apparatus 10 provides travel information video, and is operated by, for example, a tourist association or the like of each location.

The terminal apparatuses 22 and 23 are personal computers of general users A and B, respectively, and are configured to allow the users to access the server apparatus 10 via the network 30 and browse travel video.

Furthermore, the terminal apparatus 21 is installed at a travel information providing site operated by, for example, a travel information provider or the like. The terminal apparatus 21 is a video editing apparatus which selects video matching preference information of the users A and B from among travel information video provided by the server apparatus 10, edits the selected video into summary information such as digest video, digest images, or the like in accordance with preference of the users A and B, and provides the summary information to the users A and B.

In FIG. 1, for a simpler explanation, only one server apparatus 10 which provides travel information video is illustrated. In actuality, however, a large number of server apparatuses exist. Furthermore, in FIG. 1, only two users A and B are illustrated. In actuality, however, a large number of users use the travel information providing system.

Figure 2:
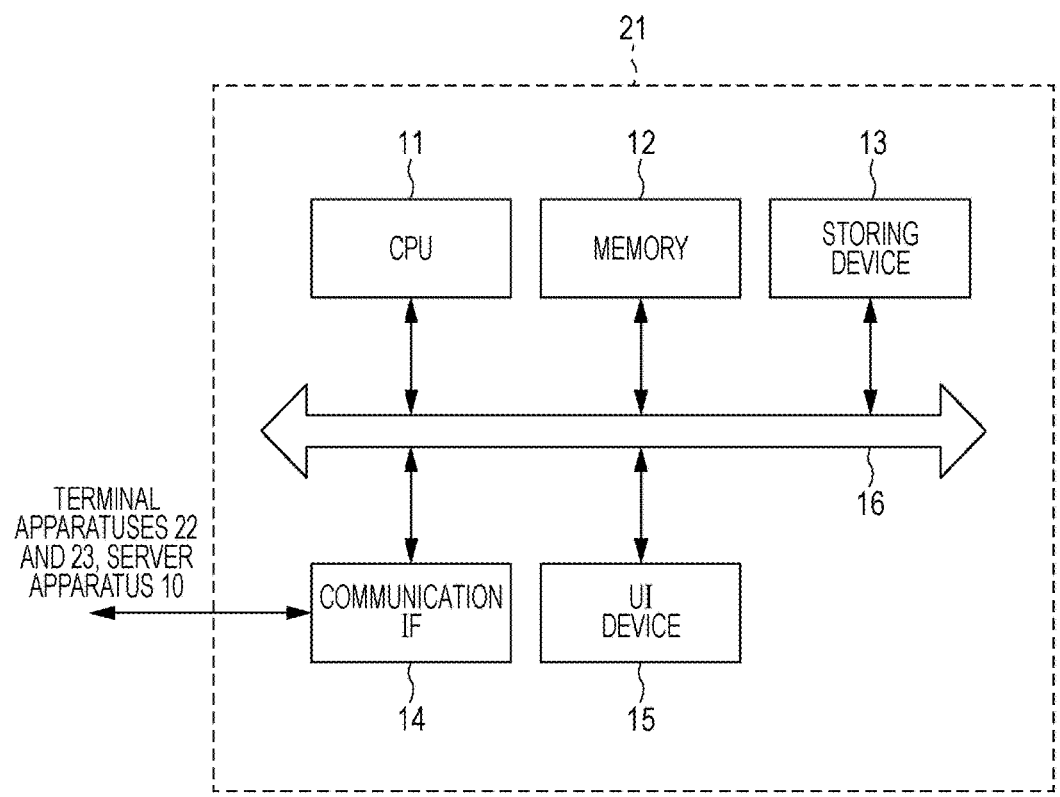
FIG. 2 is a block diagram illustrating a hardware configuration of a terminal apparatus according to an exemplary embodiment of the present invention.

A hardware configuration of the terminal apparatus 21 which functions as a video editing apparatus in a travel information providing system according to an exemplary embodiment is illustrated in FIG. 2.

The terminal apparatus 21 includes, as illustrated in FIG. 2, a central processing unit (CPU) 11, a memory 12, a storing device 13 such as a hard disk drive (HDD), a communication interface (IF) 14 which performs transmission and reception of data to and from an external apparatus or the like via the network 30, and a user interface (UI) device 15 which includes a touch panel or a liquid crystal display and a keyboard. The above components are connected to one another via a control bus 16.

The CPU 11 performs a predetermined process based on a control program stored in the memory 12 or the storing device 13, and controls an operation of the terminal apparatus 21. In this exemplary embodiment, an explanation is provided in which the CPU 11 reads a control program stored in the memory 12 or the storing device 13 and executes the read control program. However, the program may be stored in a storing medium such as a compact disc-read only memory (CD-ROM) and provided to the CPU 11.

Figure 3:
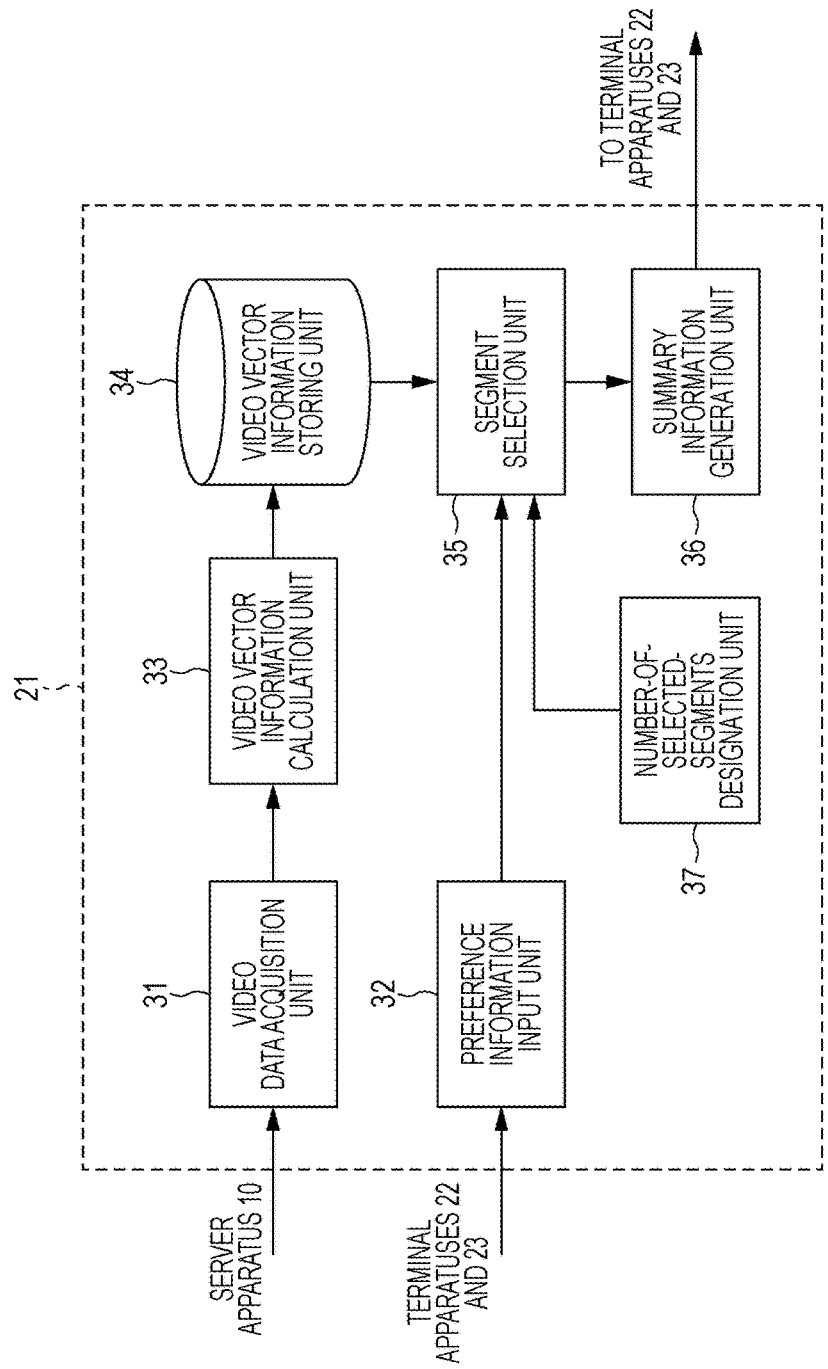
FIG. 3 is a block diagram illustrating a functional configuration of a terminal apparatus according to an exemplary embodiment of the present invention.

FIG. 3 is a block diagram illustrating a functional configuration of the terminal apparatus 21 which is implemented by executing the above control program.

The terminal apparatus 21 according to this exemplary embodiment includes, as illustrated in FIG. 3, a video data acquisition unit 31, a preference information input unit 32, a video vector information calculation unit 33, a video vector information storing unit 34, a segment selection unit 35, a summary information generation unit 36, and a number-of-selected-segments designation unit 37.

The video data acquisition unit 31 acquires, via the network 30, for example, video data such as travel information video provided by the server apparatus 10.

The preference information input unit 32 inputs, as preference information, a coefficient of each concept which is desired to be included in summary information and a coefficient of a superordinate concept of each concept which is desired to be included in summary information.

In this exemplary embodiment, video to be edited from which summary information is generated is travel information video. Therefore, for example, various items including golf, tennis, horse riding, strawberry picking, ramen, soba, sushi, castles, shrines, temples, and world heritage sites are set as concepts.

Furthermore, as a superordinate concept of each concept, for example, an item "activities" is set as a superordinate concept of concepts such as golf, tennis, horse riding, and strawberry piking, an item "dining" is set as a superordinate concept of concepts such as ramen, soba, and sushi, and an item "sightseeing spots" is set as a superordinate concept of concepts such as castles, shrines, temples, and world heritage sites.

Details of preference information will be described later.

The video vector information calculation unit 33 calculates, based on video data acquired by the video data acquisition unit 31, video vector information (video attribute information) indicating, for each concept representing the contents of video data, the confidence score that (the degree to which) the concept is included in the video data.

Specifically, the video vector information calculation unit 33 calculates video vector information by dividing video data into plural segments according to the contents of the video data, performing image processing for each of the divided segments, and calculating the confidence score that each concept is included in each of the divided segments.

The video vector information storing unit 34 stores video data acquired by the video data acquisition unit 31 as well as video vector information calculated by the video vector information calculation unit 33.

The number-of-selected-segments designation unit 37 designates the number of segments to be selected by the segment selection unit 35 for generating summary information from video data. For example, in the case where video data is divided into eight segments, the number-of-selected-segments designation unit 37 inputs a value "3" as the number of segments to be selected from the eight segments.

The segment selection unit 35 selects, based on preference information input by the preference information input unit 32, a number of segments matching the preference information, the number being designated by the number-of-selected-segments designation unit 37, from among plural segments of video data stored in the video vector information storing unit 34.

The summary information generation unit 36 generates, based on the video of the segments selected by the segment selection unit 35, summary information representing the contents of the video.

For example, the summary information generation unit 36 may generate, as summary information, digest video (summary video) which includes a series of connected segments selected by the segment selection unit 35. Furthermore, the summary information generation unit 36 may generate, as summary information, plural digest images (summary images) which include frame images extracted from the segments selected by the segment selection unit 35.

Various methods are available as a method for selecting a segment that matches preference information of a user from among plural segments into which video data has been divided.

For example, the segment selection unit 35 calculates, for each of the divided segments, a score for a subordinate concept (matching degree of a subordinate concept), based on a coefficient of each concept of preference information input by the preference information input unit 32 and a confidence score of each concept in video vector information. The segment selection unit 35 also calculates, for each segment, a score for a superordinate concept (matching degree of a superordinate concept), based on a coefficient of the superordinate concept of the preference information and a maximum value of values each obtained by multiplying a coefficient of each concept included in the superordinate concept by a confidence score of the concept in the video vector information. Then, the segment selection unit 35 selects a segment that matches the input preference information by calculating a video score (matching degree) with respect to the preference information for each segment, based on the score for the subordinate concept and the score for the superordinate concept, selecting a segment with the maximum video score, reducing a coefficient corresponding to a concept having a large confidence score value for the selected segment and a coefficient of a superordinate concept including the concept, and then sequentially calculating the matching degree with respect to the preference information for individual remaining segments (first segment selection method).

Furthermore, in the case where another segment selection method is used, the segment selection unit 35 may randomly select a predetermined number of segments from among plural segments into which video data has been divided, generate integrated video vector information by selecting a maximum value of confidence scores of a concept in the individual segments selected in a random manner and defining the selected maximum value as a confidence score of the concept, calculate a score for a superordinate concept (matching degree of a superordinate concept), based on a coefficient of the superordinate concept of preference information and a maximum value of values each obtained by multiplying a coefficient of each concept included in the superordinate concept by a confidence score of the concept in video vector information, repeat processing for randomly selecting a predetermined number of segments, and select a combination of segments which exhibits a maximum score for a superordinate concept as a segment that matches the preference information (second segment selection method).

Next, an operation of the terminal apparatus 21 in the travel information providing system according to this exemplary embodiment will be described in detail with reference to drawings.

Figure 4:
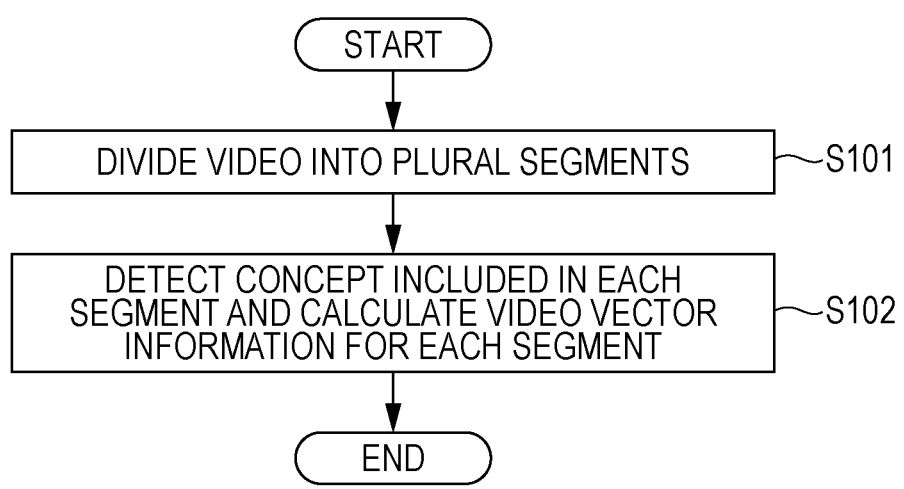
FIG. 4 is a flowchart for explaining a process for calculating video vector information by a video vector information calculation unit.

First, a process for calculating video vector information by the video vector information calculation unit 33 will be described with reference to a flowchart of FIG. 4.

The video vector information calculation unit 33 analyzes the contents of video acquired by the video data acquisition unit 31 to divide the video into plural segments according to the set of contents (step S101).

Next, the video vector information calculation unit 33 detects each concept included in each of the divided segments of the video, using a method such as object detection, image recognition, scene recognition, and motion analysis, and calculates video vector information for each segment (step S102).

For concept detection, each segment is further divided into sub-segments, and concept detection processing is performed for each of the sub-segments. Then, the maximum value of detection values of all the sub-segments is defined as the final detection value of the segment. In this case, sub-segments may overlap.

Furthermore, in such concept detection, structure analysis is performed for each frame in a segment, and a detection result obtained at the moment at which the best composition is obtained is defined as the final detection value of the segment.

Such concept detection may be performed by analyzing a foreground and a background, performing object detection for the foreground, and performing scene recognition for the background.

In the case where there are N concepts for which confidence score is to be detected, N-dimensional video vector information is calculated.

A specific example of N-dimensional video vector information calculated as described above is illustrated in FIG. 5.

In FIG. 5, a case where a piece of image data is divided into eight segments 1 to 8 and confidence scores (0 to 1) of N concepts are calculated for the segments 1 to 8 is illustrated. The number of segments into which video data is divided is not limited to eight.

N concepts: concept 1 (sushi), concept 2 (soba), concept 3 (scuba diving), concept 4 (golf), concept 5 (horse riding), . . . , and concept N (castles), are set as concepts whose confidence score is to be detected.

Confidence scores of N concepts are values each representing the degree of likelihood that the concept is included in video. The confidence score that the concept is included in the video increases as the value increases.

N-dimensional video vector information is calculated for each of the eight segments. For example, for segment 1, N-dimensional video vector information (0.196, 0.179, 0.195, 0.412, 0.134, . . . , and 0.312) is generated.

That is, the video vector information indicates a confidence score that each concept is included in each of the divided segments.

Referring to FIG. 5, for example, the confidence score of the concept 1 (sushi) exhibits a large value "0.723" in the segment 6, which represents that video of the segment 6 is highly likely to be video having something to do with sushi, such as video in which a person is eating sushi or video in which a person is introducing sushi.

Next, an example of the relationship between superordinate concepts and subordinate concepts (concepts) in the travel information providing system according to this exemplary embodiment will be described with reference to FIG. 6.

Figure 6:
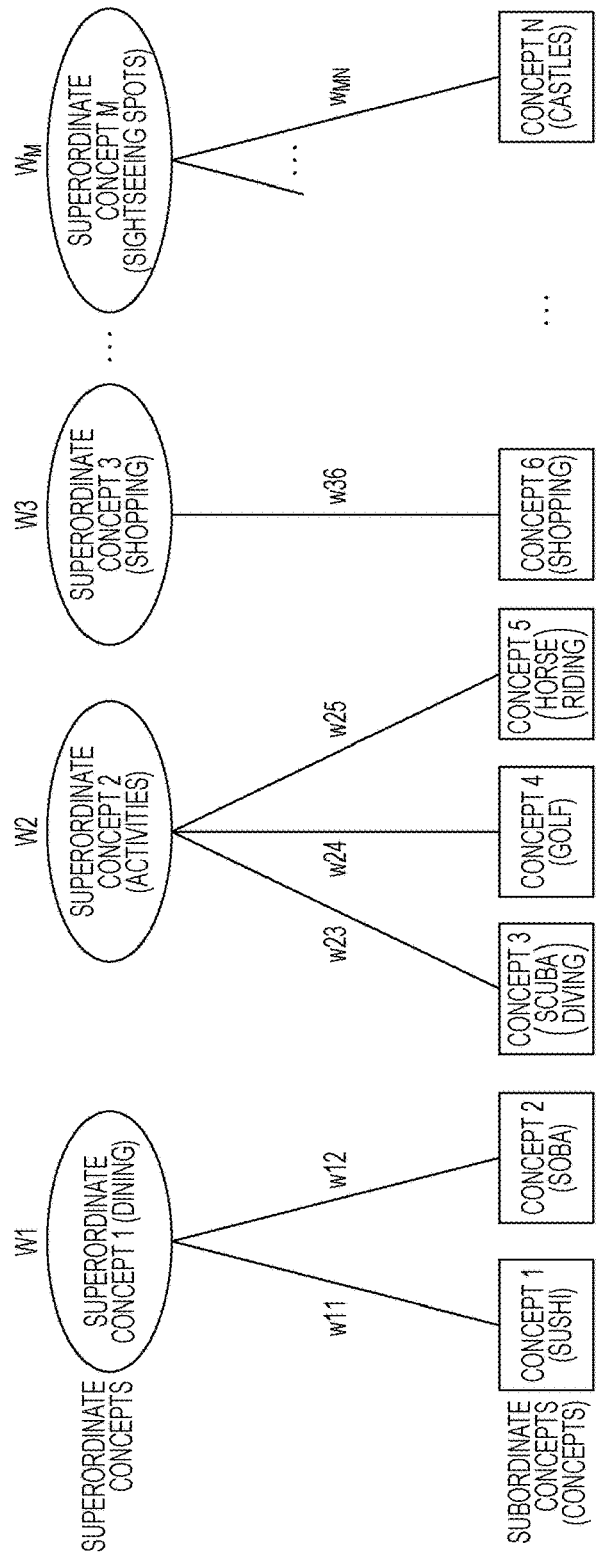
FIG. 6 is a diagram for explaining an example of the relationship between superordinate concepts and subordinate concepts (concepts) in a travel information providing system according to an exemplary embodiment of the present invention.

In the example illustrated in FIG. 6, an item of superordinate concept 1 (dining) is set as a superordinate concept of the concept 1 (sushi) and the concept 2 (soba), which are subordinate concepts. Furthermore, an item of superordinate concept 2 (activities) is set as a superordinate concept of the concept 3 (scuba diving), the concept 4 (golf), and the concept 5 (horse riding), which are subordinate concepts.

Plural concepts may not be set as subordinate concepts for a single superordinate concept. As with the case of superordinate concept 3 (shopping) and the concept 6 (shopping), only one concept may be set for a single superordinate concept. Furthermore, a concept may be included in each of plural superordinate concepts. Setting may be performed such that, for example, a concept "castles" is included in a superordinate concept "sightseeing spots" and a superordinate concept "history".

In this example, w11, w12, w23, w24, w25, w36, . . . , and $w_{MN}$ are coefficients representing the degree of preference of a user for the concepts 1 to N. Furthermore, W1, W2, W3, . . . , and $W_M$ represent coefficients representing the degree of preference of a user for the superordinate concepts 1 to M.

That is, by setting a large value for a coefficient corresponding to a concept which is desired to be included in summary information among the coefficients w11, w12, w23, w24, w25, w36, . . . , an $w_{MN}$ of the concepts, summary information of digest video or the like including the concept is generated. Furthermore, by setting a large value for a coefficient corresponding to a superordinate concept which is desired to be included in summary information among the coefficients W1, W2, W3, . . . , and $W_M$ of the superordinate concepts, a confidence score that summary information including a concept belonging to the superordinate concept is generated increases.

Next, examples of an input screen displayed when the preference information input unit 32 inputs preference information of the users A and B through the terminal apparatuses 22 and 23 or the like will be described with reference to FIGS. 7 to 9.

For example, a case where in a questionnaire for user registration of the users A and B with a travel information providing site, preference of the users A and B for traveling is investigated and preference information is generated, will be described.

Figure 7:
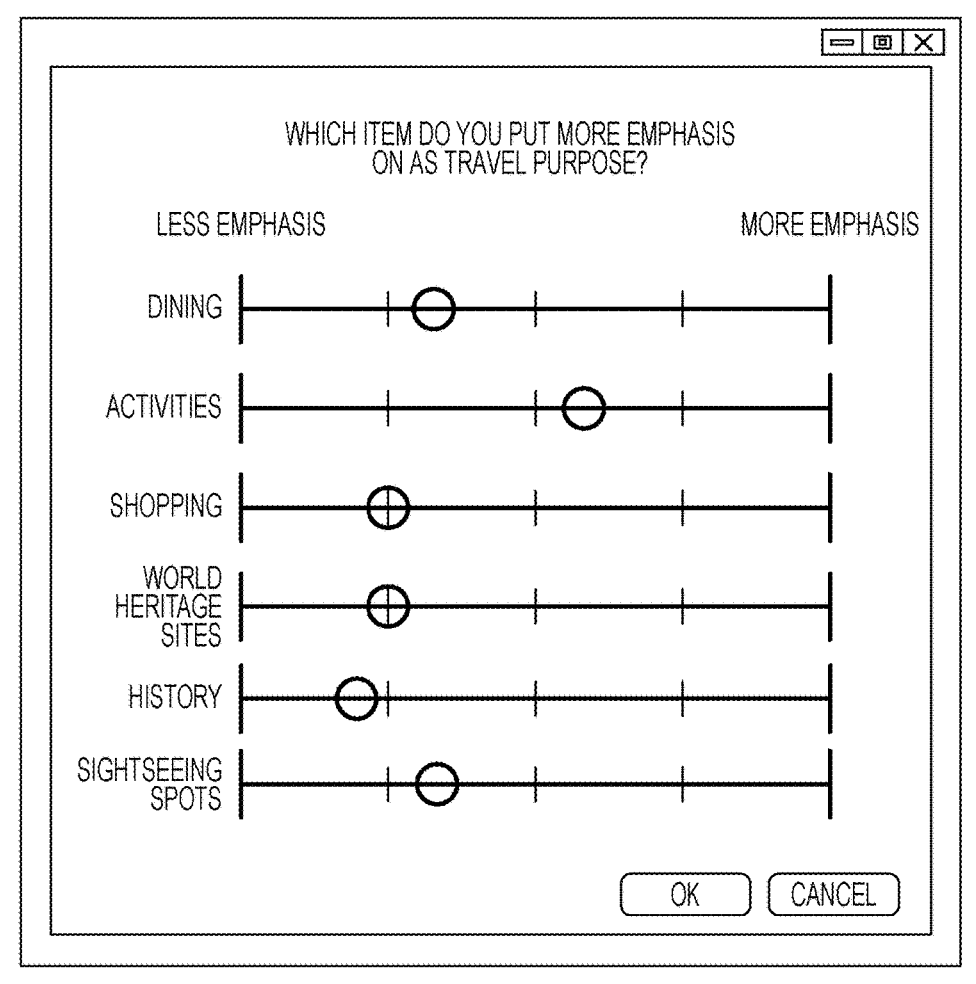

First, the preference information input unit 32 displays a screen illustrated in FIG. 7, which provides a question as to on which item the user puts emphasis as a travel purpose, and prompts the user to input the degree to which the user puts emphasis on individual items. In the screen example illustrated in FIG. 7, the item "activities" is set as a travel purpose on which more emphasis is put than the other items.

Figure 8:
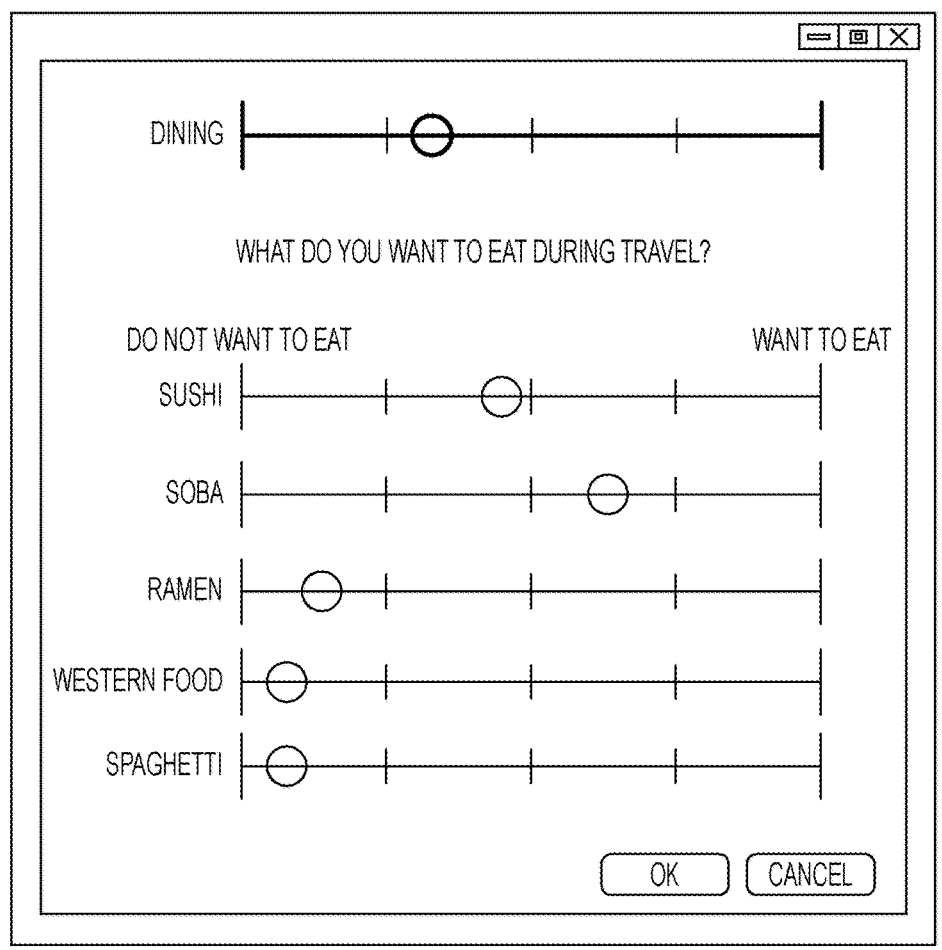
FIG. 8 is a diagram illustrating an example of an input screen displayed when preference information of a user is input.

Next, the preference information input unit 32 displays the screen illustrated in FIG. 8, which prompts the user to input the degree to which the user wants to eat individual concepts, which are subordinate concepts included in the superordinate concept "dining", during travel.

Figure 9:
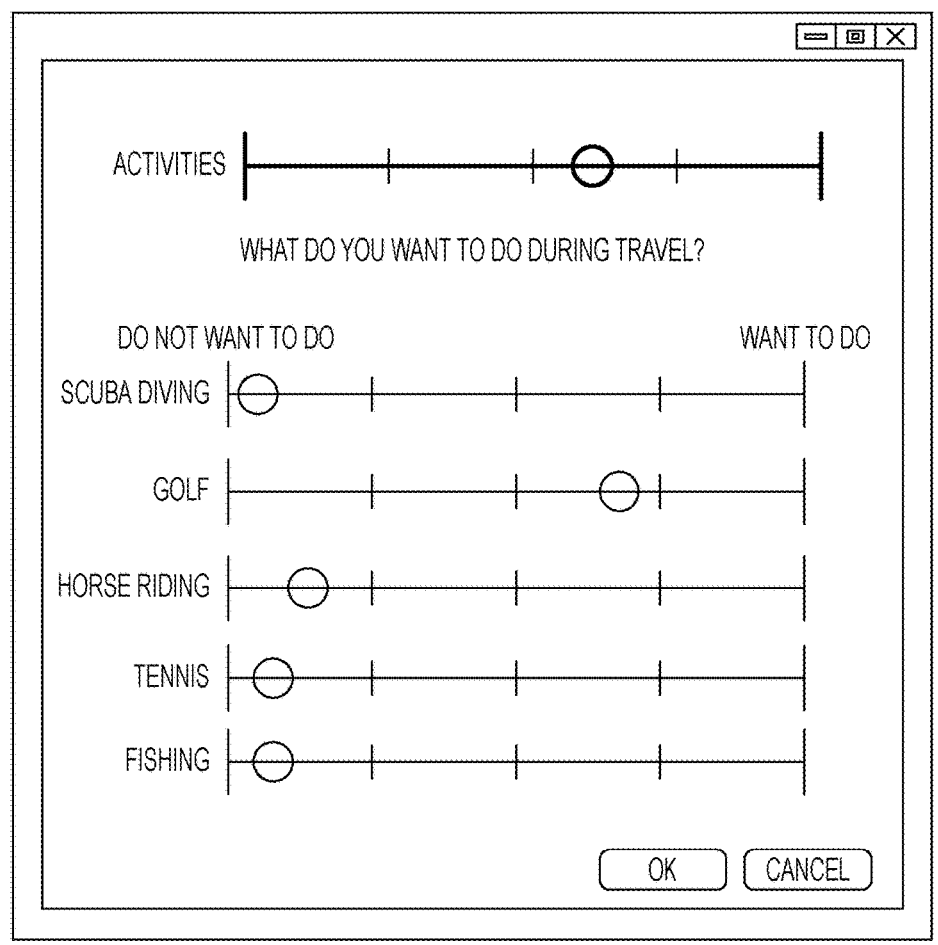
FIG. 9 is a diagram illustrating an example of an input screen displayed when preference information of a user is input.

Furthermore, in a similar manner, the preference information input unit 32 displays the screen illustrated in FIG. 9, which prompts the user to input the degree to which the user wants to do individual concepts, which are subordinate concepts included in the superordinate concept "activities", during travel. In the screen example illustrated in FIG. 9, the item "golf" is set as a travel purpose on which more emphasis is put than the other items.

Then, questionnaires for the other items of superordinate concepts are sequentially presented to the user, and preference information of the user is obtained.

The preference information input unit 32 displays the screens illustrated in FIGS. 7 to 9 to obtain preference information of travelling from the user, and sets the coefficients W1, W2, ..., and $W_N$ of superordinate concepts and the coefficients w11, w12, w23, ..., and $W_{MN}$ of concepts, which are subordinate concepts, as preference information.

An example of preference information obtained as described above through the screen examples of FIGS. 7 to 9 is illustrated in FIGS. 10A and 10B.

In FIG. 10A, as a coefficient of a superordinate concept, the coefficient W1 of the superordinate concept 1 (dining) is set to "0.3" and the coefficient W2 of the superordinate concept 2 (activities) is set to "0.9". That is, the user puts more emphasis on activities than dining as a travel purpose, and setting is performed such that information including activities is preferentially provided as travel information to be provided to the user.

Furthermore, in FIG. 10B, as a coefficient of a subordinate concept (concept), the coefficient W11 of the concept 1 (sushi) is set to "0.5", the coefficient W12 of the concept 2 (soba) is set to "0.6", the coefficient W23 of the concept 3 (scuba diving) is set to "0.0", and the coefficient W24 of the concept 4 (golf) is set to "0.8". That is, the user desires to obtain travel information of sushi and soba. However, the user desires to obtain travel information of golf more than travel information of dining. Therefore, the above values are set.

The preference information input unit 32 may automatically obtain preference information based on the contents written to a social networking service (SNS) of the user, instead of inputting preference information based on the contents input by the user as described above, and input a coefficient of a superordinate concept and a coefficient of each concept.

Next, processing for calculating a score for a subordinate concept, a score for a superordinate concept, and a video score by the segment selection unit 35 in the case where the preference information illustrated in FIGS. 10A and 10B is set, will be described with reference to FIGS. 11 to 13.

First, a method for calculating a score for a subordinate concept and a score for a superordinate concept will be described with reference to FIG. 11. In FIG. 11, a method for calculating a score for a subordinate concept and a score for a superordinate concept for the segment 1 is explained.

Figure 11:
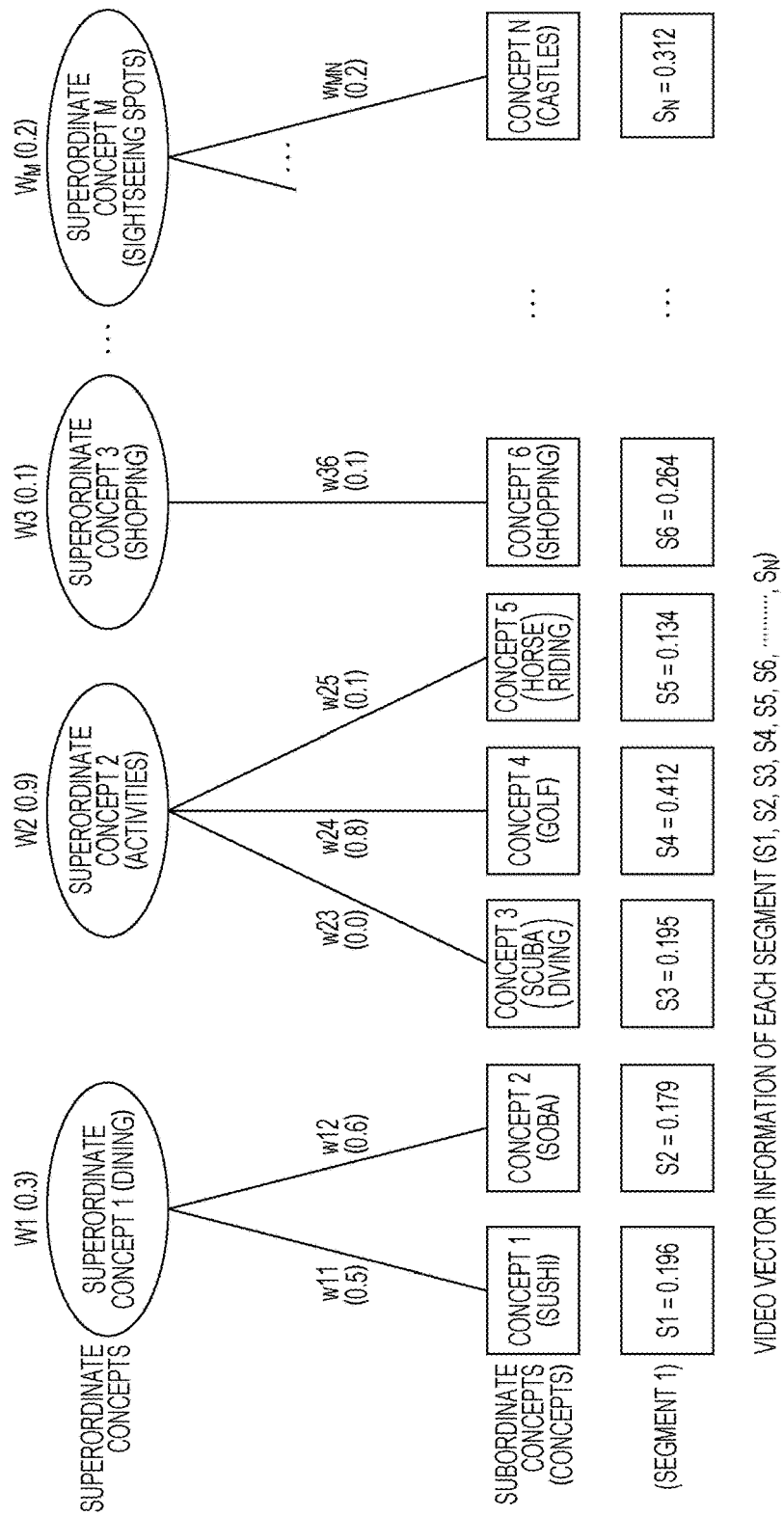
FIG. 11 is a diagram for explaining a method for calculating a score for a subordinate concept and a score for a superordinate concept.

As illustrated in FIG. 11, the segment selection unit 35 calculates a score for a subordinate concept, based on the N-dimensional video vector information (S1, S2, S3, ..., and $S_N$) of the individual segments illustrated in FIG. 5 and the coefficients w11, w12, w23, ..., and $w_{MN}$ of the concepts, which are subordinate concepts, illustrated in FIGS. 10A and 10B.

Furthermore, the segment selection unit 35 calculates a score for a superordinate concept, based on the N-dimensional video vector information (S1, S2, S3, ..., and $S_N$), the coefficients w11, w12, w23, ..., and $w_{MN}$ of the concepts illustrated in FIGS. 10A and 10B, and the coefficients W1, W2, ..., and $W_N$ of superordinate concepts.

Then, the segment selection unit 35 calculates, based on the score for the subordinate concept and the score for the superordinate concept, a video score representing the matching degree of video data and preference information.

Specific calculation expressions for calculating a score for a subordinate concept, a score for a superordinate concept, and a video score is illustrated in FIG. 12.

First, the score for the subordinate concept is obtained by multiplying the video vector information (S1, S2, S3, ..., and $S_N$) by the coefficients w11, w12, w23, ..., and $w_{MN}$ of individual concepts and obtaining an accumulated value of the results, as represented by expression (1) of FIG. 12.

Specifically, the score for the subordinate concept is obtained by calculating $S1 \cdot w11 + S2 \cdot w12 + S3 \cdot w23 + \ldots + S_N \cdot w_{MN}$.

Then, the score for the superordinate concept is obtained by multiplying, for each category of a superordinate concept, the maximum value of values each obtained by multiplying the value of a confidence score of each concept of video vector information by a coefficient of the concept by a coefficient of the category of the superordinate concept and then accumulating the values obtained for individual superordinate concepts, as represented by expression (2) of FIG. 12.

For example, for the superordinate concept 1 (dining), the maximum value of $S1 \cdot w11$ and $S2 \cdot w12$ is obtained based on max($S1 \cdot w11$, $S2 \cdot w12$). For example, in the case where $S1 \cdot w11$ is maximum, $W1 \cdot S1 \cdot w11$, which is obtained by multiplying the value by the coefficient W1 of the superordinate concept 1, is defined as a value for the superordinate concept 1. Then, such a value is obtained for each superordinate concept, and a value obtained by accumulating the values is defined as a score for a superordinate concept.

Furthermore, the video score is calculated by multiplying the score for the subordinate concept and the score for the superordinate concept by p and (1−p), respectively, and adding the obtained results, as represented by expression (3) of FIG. 12. The value of p is equal to or more than 0 and smaller than or equal to 1. That is, the value of p represents a value for setting which one of the score of the superordinate concept and the score of the subordinate concept is to be given priority. More priority is given to the score for the subordinate concept as the value of p increases, and more priority is given to the score for the superordinate concept as the value of p decreases.

A calculation example in which a score for a subordinate concept, a score for a superordinate concept, and a video score are specifically calculated by substituting the value for the segment 1 of an example of video vector information illustrated in FIG. 5 and the values of coefficients illustrated in FIGS. 10A and 10B in the expressions illustrated in FIG.

12, is illustrated in FIG. 13. In FIG. 13, a case where the value of p for calculating a video score is set to 0.4 is illustrated.

As represented by expression (1) of FIG. 13, a value 0.196×0.5+0.179×0.6+ . . . +0.312×0.2=20.124 is calculated as a score for a subordinate concept.

Furthermore, as represented by expression (2) of FIG. 13, a value 0.3×0.179×0.6+0.9×0.412×0.8+ . . . +0.2×0.312× 0.2=30.806 is calculated as a score for a superordinate concept.

Then, as represented by expression (3) of FIG. 13, a value 0.4×20.124+0.6×30.806≈26.533 is calculated as a video score.

Then, the segment selection unit 35 calculates the above video score for each segment of travel information video obtained by the video data acquisition unit 31, and selects a segment to be included in summary information, based on the calculated value.

Next, a segment selection method performed by the segment selection unit 35 as described above will be described with reference to a flowchart.

Figure 14:
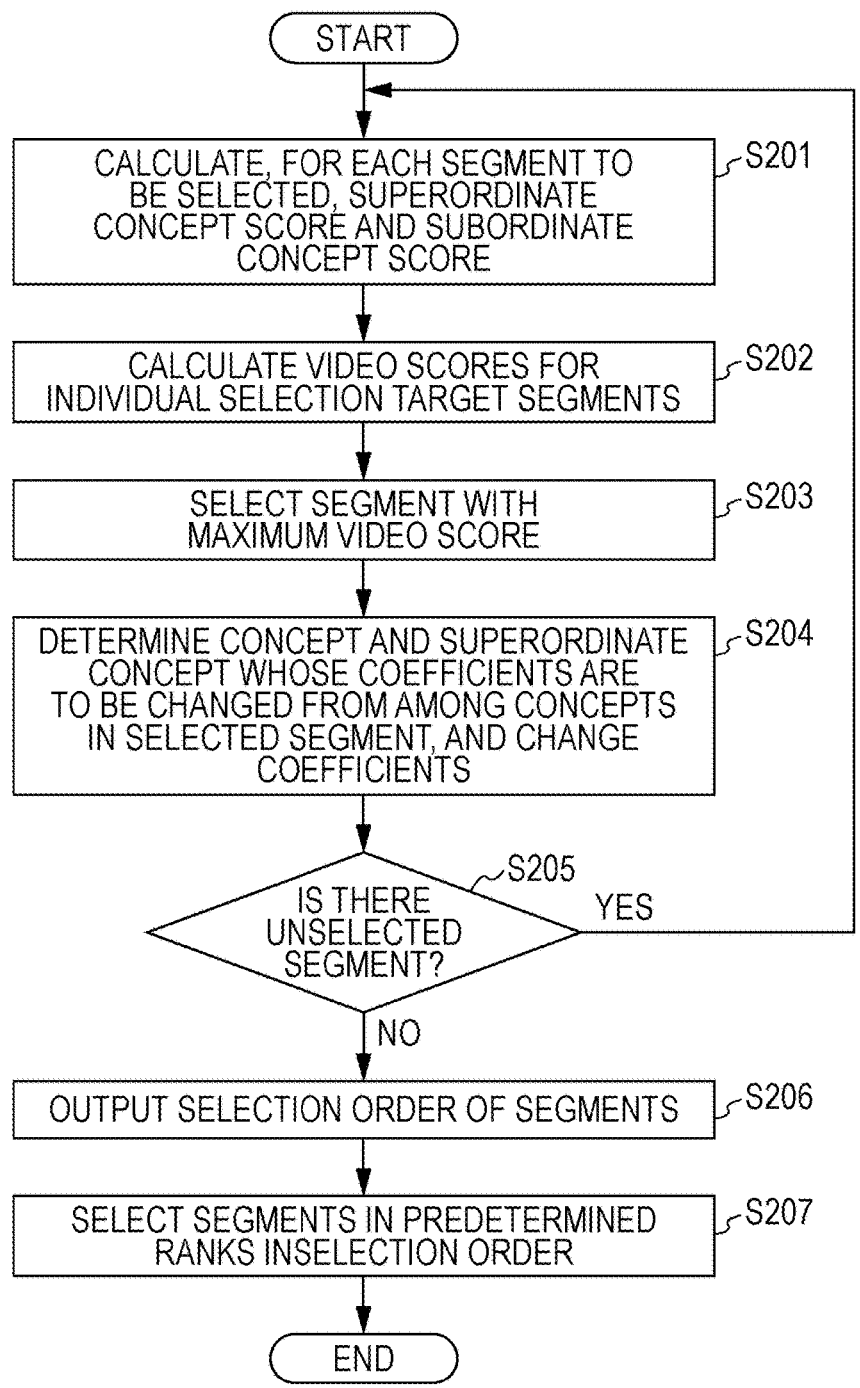
FIG. 14 is a flowchart for explaining a first segment selection process by a segment selection unit.

First, a first segment selection method for calculating a video score for each segment, selecting a segment with a maximum video score, changing a coefficient of a concept and a coefficient of a superordinate concept, and sequentially selecting the next segment, will be described with reference to a flowchart of FIG. 14.

First, the segment selection unit 35 calculates, for each segment to be selected, a score for a superordinate concept and a score for a subordinate concept (step S201), and calculates a video score of each segment, based on the calculated score of the superordinate concept and the calculated score for the subordinate concept (step S202).

Then, the segment selection unit 35 selects a segment with a maximum video score (step S203).

Next, the segment selection unit 35 selects a coefficient to be changed, from among coefficients of individual concepts and coefficients of individual superordinate concepts which are used for calculation of video vector information, and reduces the selected coefficient by, for example, multiplying the value of the coefficient by 0.5 (step S204).

Specifically, for example, the segment selection unit 35 changes a coefficient corresponding to a concept with a high confidence score in the selected segment and a coefficient of a superordinate concept of the concept, among coefficients of individual concepts and coefficients of individual superordinate concepts.

Figure 15A:
FIGS. 15A and 15B are diagrams for explaining a specific example of a case where the segment selection unit changes a coefficient of a concept and a coefficient of a superordinate concept.
Figure 15B:

A specific example for changing a coefficient as described above is illustrated in FIGS. 15A and 15B. In FIGS. 15A and 15B, a case where a coefficient of the concept 4 (golf) and a coefficient of the superordinate concept 2 (activities) including the concept 4 (golf) are changed is illustrated. Referring to FIGS. 15A and 15B, the coefficient of the concept 4 (golf) is changed from 0.8 to 0.4, and the coefficient of the superordinate concept 2 (activities) is changed from 0.9 to 0.45.

In the case where there is an unselected segment (Yes in step S205), the segment selection unit 35 repeats the processing of steps S201 to S204 for the unselected segment. For example, in the case where the segment 1 is selected, the segment selection unit 35 performs similar processing for the remaining segments 2 to 8.

Then, when processing for all the segments is completed (No in step S205), the segment selection unit 35 outputs the selection order of the segments (step S206), and selects segments in predetermined ranks in the selection order as segments that match preference information (step S207).

A specific example of segments rearranged in the selection order as described above is illustrated in FIG. 16. In a list of segments illustrated in FIG. 16, an example in which segments are selected in the order of segments 1, 6, 7, 4, 5, 2, 8, and 3 is illustrated.

For example, in the case where top three segments are selected as segments to be included in summary information, the segments 1, 6, and 7 are selected by the segment selection unit 35.

Figure 17:
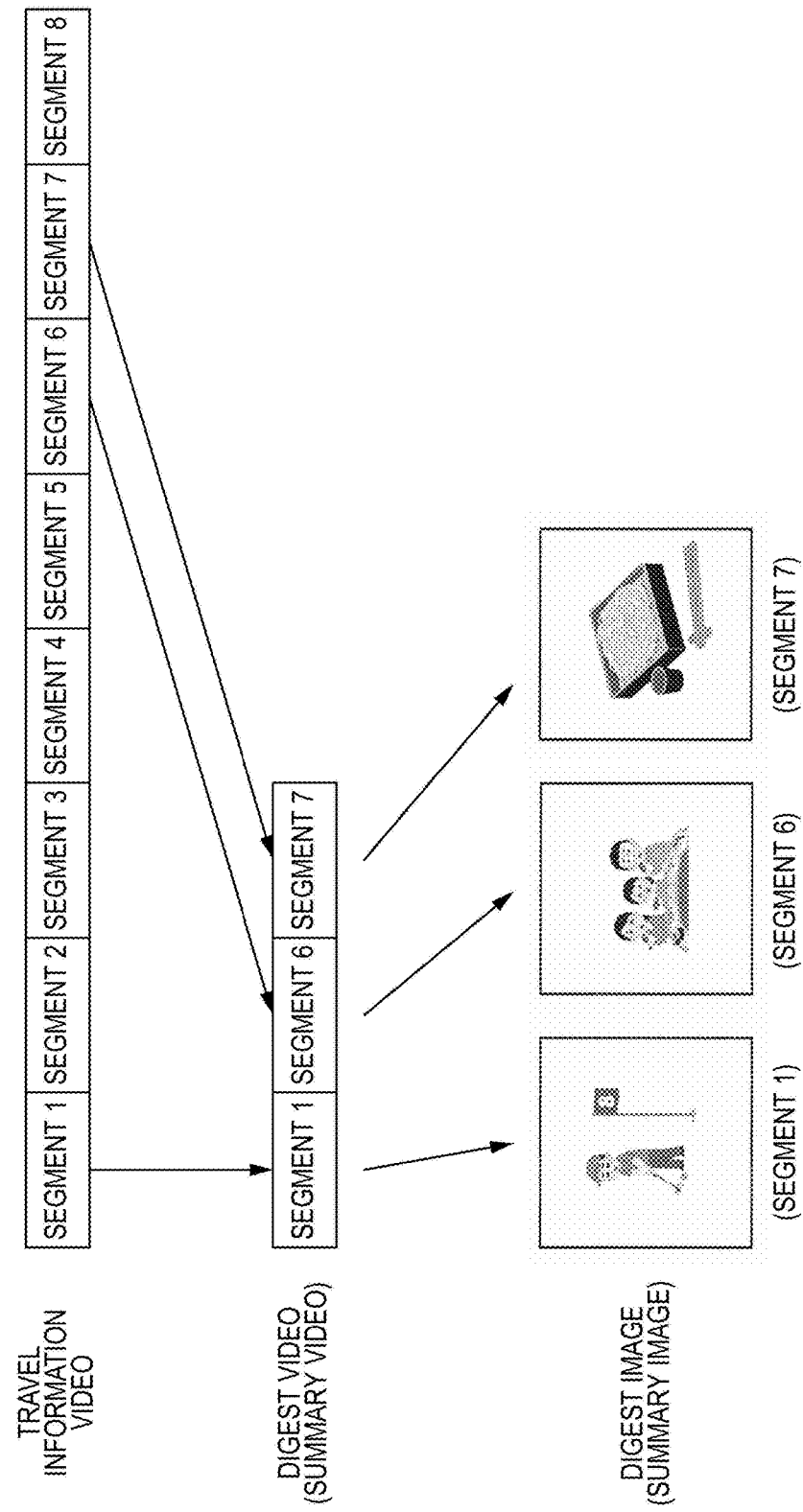
FIG. 17 is a diagram illustrating an example of generation of summary information generated by a summary information generation unit.

A generation example of summary information generated by the summary information generation unit 36 in the case where such segments are selected is illustrated in FIG. 17.

In FIG. 17, a case where the segments 1, 6, and 7 are selected as segments to be included in summary information, and therefore, for example, digest video (summary video) is generated by connecting video of the segments 1, 6, and 7 is illustrated.

Furthermore, in FIG. 17, a state in which a digest image (summary image) is generated from travel information video by extracting frame images of the segments 1, 6, and 7 is illustrated.

Figure 18:
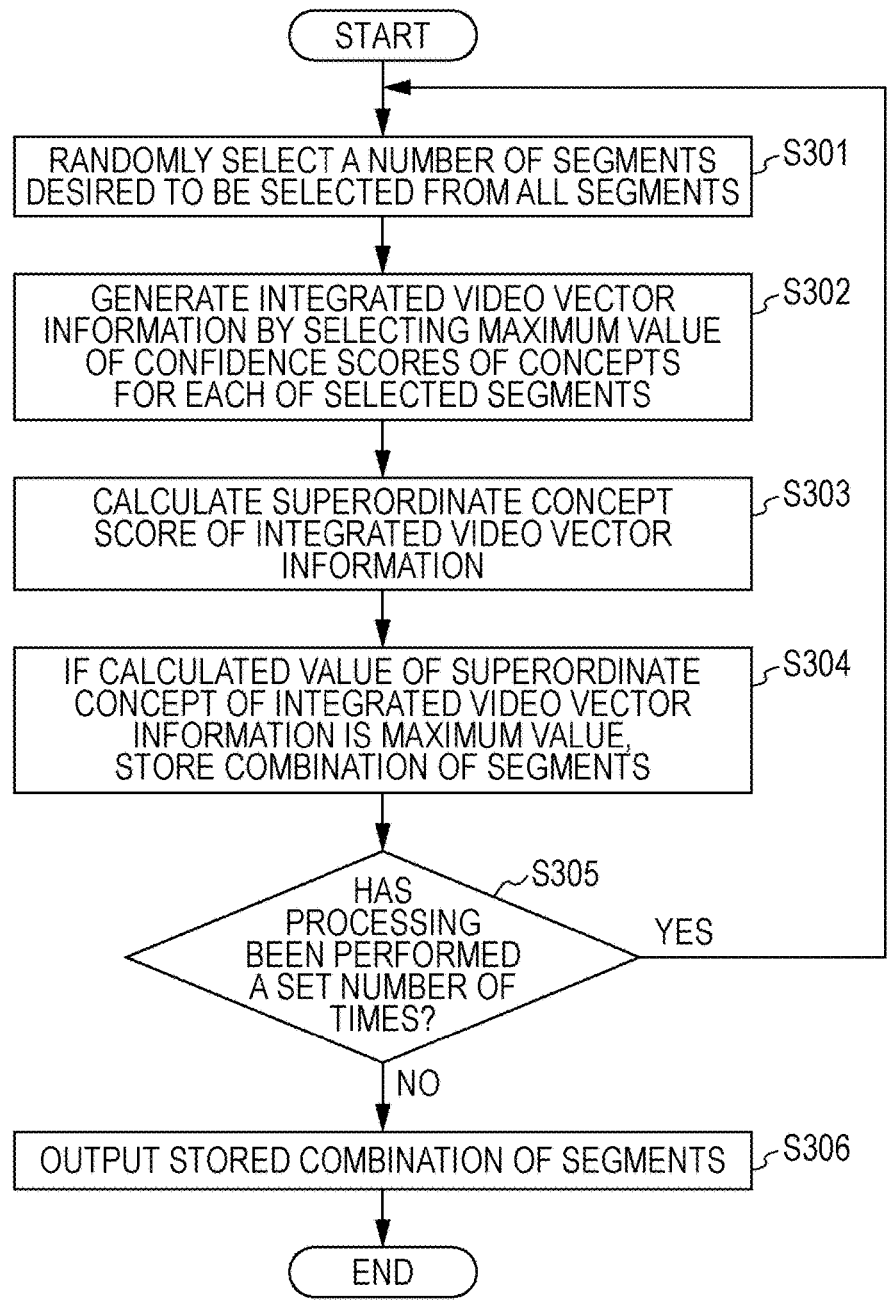
FIG. 18 is a flowchart for explaining a second segment selection process by the segment selection unit.

Next, a second segment selection method for selecting a segment to be included in summary information by randomly selecting plural segments from among plural segments into which video data has been divided, generating integrated video vector information from video vector information of a combination of plural segments, and finding a combination of plural segments which exhibits a large score for a superordinate concept of the integrated video vector information, will be described with reference to a flowchart of FIG. 18.

First, the segment selection unit 35 randomly selects a predetermined number of segments from among previous segments (step S301). For example, in the case where three is designated by the number-of-selected-segments designation unit 37 as the number of segments to be included in summary information, three segments are selected from eight segments.

Next, the segment selection unit 35 generates integrated video vector information by selecting a maximum value of confidence scores of concepts for the selected three segments (step S302).

Figure 19:
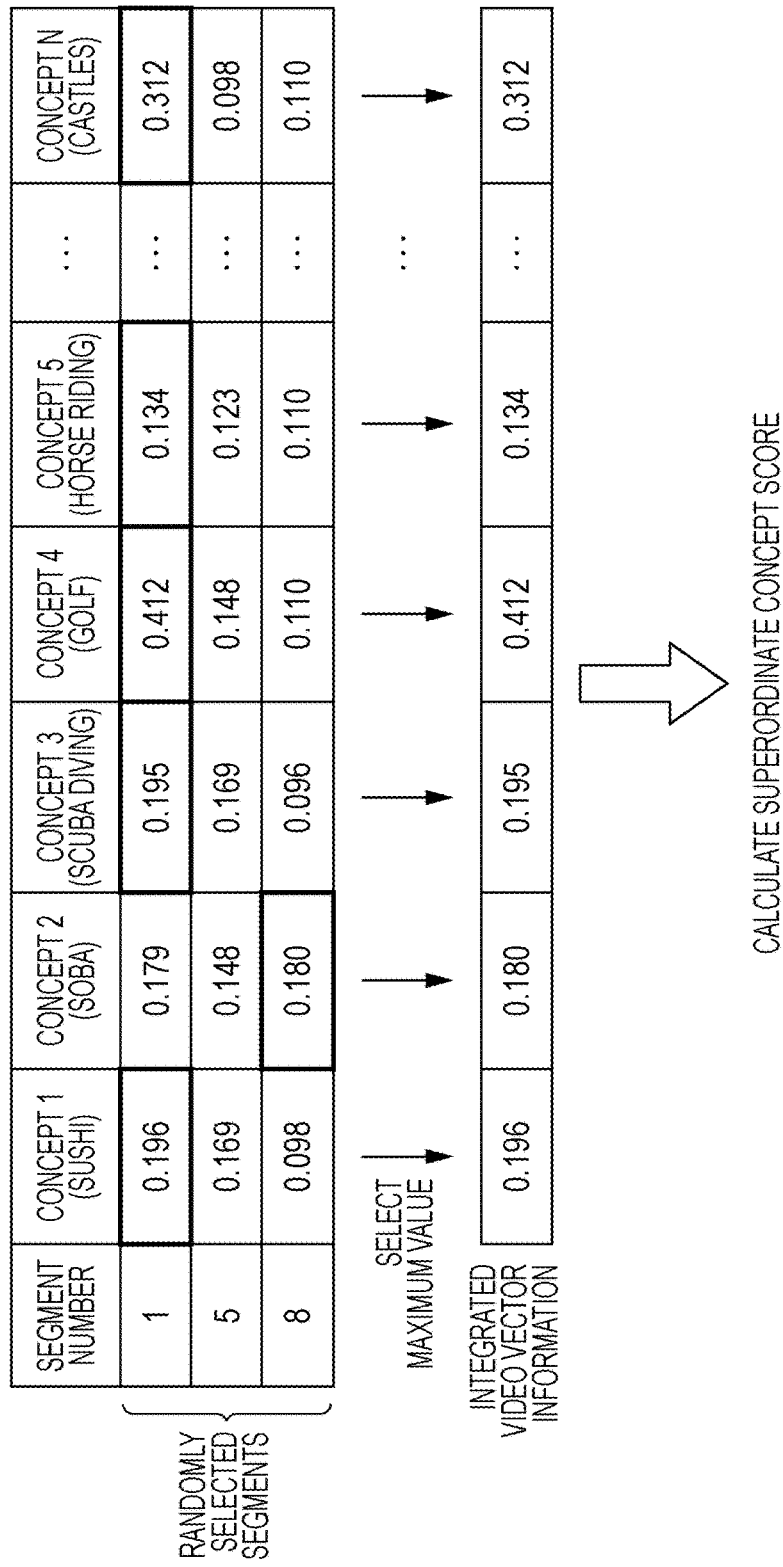
FIG. 19 is a diagram for specifically explaining the second segment selection process.

For example, as illustrated in FIG. 19, in the case where the randomly selected three segments are the segments 1, 5, and 8, integrated video vector information is generated by selecting a maximum value of confidence scores for each concept.

Then, the segment selection unit 35 calculates a score for a superordinate concept, based on the generated integrated video vector information (step S303). The method for calculating a superordinate concept score is the same as the calculation method represented by expression (2) of FIG. 12.

Then, in the case where the calculated value of the superordinate concept score is larger than a previously calculated value, the segment selection unit 35 stores the value, and stores information of the combination of segments (step S304). In contrast, in the case where the calculated value of the superordinate concept score is smaller than the past maximum value, the segment selection unit 35 disposes of the value of the superordinate concept score and information of the combination of segments.

Then, the processing of steps S301 to S304 is repeated a predetermined number of times, for example, 100 times (step S305). After that, the stored information of the combination of segments is output (step S306).

In the second segment selection method illustrated in the flowchart of FIG. 18, in the randomly selected plural segments, a calculated score for a superordinate concept of a combination of segments increases as values of confidence scores of different concepts increase.

In particular, for calculation of a score for a superordinate concept, only a maximum value of values each obtained by multiplying a confidence score of a concept by a coefficient of the concept is selected for each superordinate concept. Therefore, a combination of segments having high confidence scores of concepts belonging to different superordinate concepts has a larger score for a superordinate concept.

For example, as illustrated in FIG. 20, in the case where the segments 1, 6, and 7 are selected, the confidence score of the concept 1 (sushi) in the segment 6 exhibits a large value 0.723, and the confidence score of the concept 4 (golf) in the segment 1 exhibits a large value 0.412.

Therefore, in the case where the combination of segments illustrated in FIG. 20 is randomly selected, a large score for a superordinate concept is calculated.

As a result, by randomly selecting plural segments, selecting only a maximum value from video vector information of the selected segments to generate integrated video vector information, calculating a score for a superordinate concept, and finding a combination of segments which exhibits a large superordinate concept score, a combination of segments in which confidence scores of various concepts with a large coefficient in preference information of a user are large as well as segments in which only confidence scores of the same concept are large, may be selected.

In the foregoing exemplary embodiment, a case where summary information is generated by dividing video data of travel information into plural segments and selecting a segment that matches preference information from among the divided plural segments has been described. However, the present invention is not limited to this. The present invention may also be applied to a case where summary information is generated from video data different from travel information video.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A video editing apparatus comprising:
 a storing unit that stores video data along with video attribute information indicating, for each concept, a confidence score that the concept is included in each of a plurality of segments into which the video data has been divided;
 an input unit that inputs, as preference information, a coefficient of each concept which is desired to be included in summary information and a coefficient of a superordinate concept of the concept which is desired to be included in the summary information;
 a segment selection unit that selects, based on the preference information input by the input unit, at least one segment that matches the preference information, from among the plurality of segments of the video data stored in the storing unit; and
 a generation unit that generates, based on video of the at least one segment selected by the segment selection unit, the summary information representing contents of the video.

2. The video editing apparatus according to claim 1, further comprising:
 a calculation unit that calculates the video attribute information by dividing the video data into the plurality of segments according to contents of the video data, performing image processing for each of the divided segments, and calculating the confidence score that each concept is included in the segment.

3. The video editing apparatus according to claim 1, wherein the segment selection unit selects at least one segment that matches the input preference information by performing the following:
 calculating, for each of the plurality of segments, a matching degree of a subordinate concept, a matching degree of a superordinate concept, and a matching degree with respect to the preference information, the matching degree of the subordinate concept being calculated based on the coefficient of each concept included in the preference information and the confidence score of the concept indicated by the video attribute information, the matching degree of the superordinate concept being calculated based on the coefficient of the superordinate concept included in the preference information and a maximum value of values each obtained by multiplying a coefficient of each concept included in the superordinate concept by the confidence score of the concept indicated by the video attribute information, the matching degree with respect to the preference information for the segment being calculated based on the matching degree of the subordinate concept and the matching degree of the superordinate concept;
 selecting a segment corresponding to a maximum value of the calculated matching degree with respect to the preference information;
 reducing a coefficient corresponding to a concept with a large confidence score in the selected segment and a coefficient of a superordinate concept including the concept with the large confidence score; and
 then sequentially calculating a matching degree with respect to the preference information for remaining segments.

4. The video editing apparatus according to claim 1, wherein the segment selection unit randomly selects a predetermined number of segments from among the plurality of segments into which the video data has been divided, generates integrated video attribute information by selecting a maximum value of the confidence scores of each concept in the randomly selected segments and defining the selected value as the confidence score of the concept, calculates a matching degree of a superordinate concept based on the coefficient of the superordinate concept included in the preference information and a maximum value of values each obtained by multiplying the coefficient of each concept included in the superordinate concept by the confidence score of the concept indicated by the video attribute information, repeats processing for randomly selecting the predetermined number of segments, and selects a combination of segments which exhibits a maximum matching degree of a superordinate concept as the at least one segment that matches the preference information.

5. The video editing apparatus according to claim 1, wherein the segment selection segment selects the plurality of segments as the at least one segment, and the generation unit generates summary video as the summary information by connecting the plurality of selected segments.

6. The video editing apparatus according to claim 1, wherein the generation unit generates a plurality of summary images which include a frame image extracted from the at least one segment selected by the segment selection unit as the summary information.

7. The video editing apparatus according to claim 1, further comprising a designation unit that designates a number of segments to be selected by the segment selection unit.

8. A video editing method comprising:
  storing video data along with video attribute information indicating, for each concept, a confidence score that the concept is included in each of a plurality of segments into which the video data has been divided;
  inputting, as preference information, a coefficient of each concept which is desired to be included in summary information and a coefficient of a superordinate concept of the concept which is desired to be included in the summary information;
  selecting, based on the input preference information, at least one segment that matches the preference information, from among the plurality of segments of the stored video data; and
  generating, based on video of the at least one selected segment, the summary information representing contents of the video.

9. A non-transitory computer readable medium storing a program causing a computer to execute a process for editing video, the process comprising:
  storing video data along with video attribute information indicating, for each concept, a confidence score that the concept is included in each of a plurality of segments into which the video data has been divided;
  inputting, as preference information, a coefficient of each concept which is desired to be included in summary information and a coefficient of a superordinate concept of the concept which is desired to be included in the summary information;
  selecting, based on the input preference information, at least one segment that matches the preference information, from among the plurality of segments of the stored video data; and
  generating, based on video of the at least one selected segment, the summary information representing contents of the video.

* * * * *